US008249249B2

(12) United States Patent
Lin

(10) Patent No.: US 8,249,249 B2
(45) Date of Patent: Aug. 21, 2012

(54) SYSTEM AND METHOD FOR TEXT-BASED ENCRYPTION

(75) Inventor: Gen Lin, La Palma, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1162 days.

(21) Appl. No.: 12/052,127

(22) Filed: Mar. 20, 2008

(65) Prior Publication Data

US 2008/0292097 A1 Nov. 27, 2008

Related U.S. Application Data

(60) Provisional application No. 60/896,709, filed on Mar. 23, 2007.

(51) Int. Cl.
*H04L 29/06* (2006.01)
(52) U.S. Cl. .......... 380/28; 713/162; 713/163; 713/164; 713/165; 713/166; 713/167
(58) Field of Classification Search .................. None
See application file for complete search history.

(56) References Cited

U.S. PATENT DOCUMENTS

| 4,468,756 | A | * | 8/1984 | Chan ................................. 704/4 |
| 5,799,090 | A | * | 8/1998 | Angert ............................ 380/43 |
| 5,905,801 | A | * | 5/1999 | Serinken ......................... 380/51 |
| 6,035,042 | A | | 3/2000 | Mittenthal |
| 6,173,252 | B1 | * | 1/2001 | Qiu et al. .......................... 704/9 |
| 6,230,288 | B1 | * | 5/2001 | Kuo et al. .................. 714/38.14 |
| 6,357,002 | B1 | * | 3/2002 | Lupo et al. ........................ 713/1 |
| 7,027,973 | B2 | * | 4/2006 | Macklin ............................ 704/2 |
| 2003/0014237 | A1 | * | 1/2003 | Macklin ............................ 704/2 |
| 2003/0035008 | A1 | * | 2/2003 | Fuller et al. ................... 345/771 |
| 2003/0200078 | A1 | * | 10/2003 | Luo et al. .......................... 704/2 |
| 2005/0002053 | A1 | * | 1/2005 | Meador et al. ............... 358/1.14 |
| 2006/0106593 | A1 | * | 5/2006 | Schultz et al. .................... 704/5 |
| 2007/0064933 | A1 | | 3/2007 | Bantwal |
| 2007/0169013 | A1 | * | 7/2007 | Bak et al. ...................... 717/136 |

OTHER PUBLICATIONS

International Search Report for PCT/US2008/003737 Dated Dec. 30, 2008.
Eastlake D et al, "Randomness Requirements for Security (RFC 4086)" IETF Standard, Internat Engineering Task Force, IETF, SH, Jun. 1, 2005, pp. 22-23.
Lee R B et al: "Architectural Techniques for Accelerating Subword Permutations With Reptitions" IEEE Transactions on Very Large Scale Integration (VLSI) Systems, IEEE Service Center, Piscataway, NJ, US, vol. 11, No. 3, Jun. 1, 2003, Paragraphs [00II], [0III].

* cited by examiner

*Primary Examiner* — Eleni Shiferaw
*Assistant Examiner* — Phy Anh Vu

(57) ABSTRACT

A system, method, and computer program for text-based encryption, involves accessing a text file with a plurality of lines of text characters; re-sequencing each of the text characters in the plurality of lines; translating a base representation for each of the text characters by an offset of a base value so that a resulting translated character is printable; inserting a plurality of other characters between each of the translated text characters on each of the lines to form a random character string; inserting a plurality of random numbers of random characters before and after the random character string to output to a resultant file; and including a translated seed with the resultant file.

20 Claims, 2 Drawing Sheets

SYSTEM AND METHOD FOR TEXT-BASED ENCRYPTION

CROSS-REFERENCE TO RELATED APPLICATIONS

This Application claims priority to pending Provisional U.S. Application Ser. No. 60/896,709, filed on Mar. 23, 2007, which application is incorporated herein by reference in its entirety.

TECHNICAL FIELD

The presently preferred embodiment of the innovations described herein relate generally to software applications. More specifically, the presently preferred embodiment relates to a system and method for text-based encryption scheme for source code protection.

BACKGROUND

Computer software applications written in programming languages, e.g., C or C++, are delivered in the form of compiled binary executable files, so that the source code of the program are well protected from view. Conversely, software systems written in interpretive or scripting languages, e.g., Tcl or Perl, are commonly delivered in the form of readable source code or scripts in text-readable format. Often, compiled software applications are also delivered with certain supporting data files that can be in the form of readable text of any formats, such as scripts in Tcl or Perl. The textual form of delivery for software applications provides the advantages of being platform independent and easy for customization; nevertheless it leaves the source code of the script file viewable with any text reader, and conversely any intellectual property contained within the scripts is easily viewable and thus unprotected. Critical and/or sensitive source scripts or supporting data files in textual form are not protected against inadvertent or improper alterations. Software elements in textual form are also inadequate to be protected against unauthorized uses.

To solve these problems, commercial software applications will sometimes compile the deliverable source code or supporting data files into binary images. Although this approach provides good protection, it requires the deliverable files be prepared individually for each computer platform because compiling object code from source code is typically platform dependant.

What is needed is a system and method for text-based source code encryption that is platform independent.

SUMMARY

To achieve the foregoing, and in accordance with the purpose of the presently preferred embodiment as described herein, the present application provides a method for text-based encryption, comprising accessing a text file with a plurality of lines of text characters; re-sequencing each of said text characters; translating a base representation for each of said text character by an offset of a base value so that a resulting translated character is printable; inserting a plurality of characters between each of said translated text characters on each of said line to form a random character string; inserting a plurality of random numbers of random characters before and after said random character string to output to a resultant file; and including a translated seed with said resultant file. The method, wherein said resultant file contains a seed number at a known location. The method, wherein said seed number is calculated from a clock. The method, wherein said text file contains a plurality of commands that are readable by a scripted language. The method, wherein translated character is within a set of printable ASCII codes. The method, wherein said set of printable of ASCII codes is between a decimal value of 32 and a decimal value of 126. The method, wherein said base value is a decimal value of 158. The method, wherein said plurality of random numbers is determined from a random number generator. The method, wherein said base representation is an octal representation. The method, wherein said octal representation for each of said text character by an offset of an octal value so that a resulting translated character is printable.

An advantage of the presently preferred embodiment is to provide a computer-program product tangibly embodied in a machine readable medium to perform a method for text-based encryption, comprising instructions operable to cause a computer to access a text file with a plurality of lines of text characters; re-sequence each of said text characters; translate a base representation for each of said text character by an offset of a base value so that a resulting translated character is printable; insert a plurality of characters between each of said translated text characters on each of said line to form a random character string; insert a plurality of random numbers of random characters before and after said random character string to output to a resultant file; and include a translated seed with said resultant file. The computer-program product, wherein said resultant file contains a seed number at a known location. The computer-program product, wherein said seed number is calculated from a clock. The computer-program product, wherein said text file contains a plurality of commands that are readable by a scripted language. The computer-program product, wherein translated character is within a set of printable ASCII codes. The computer-program product, wherein said set of printable of ASCII codes is between a decimal value of 32 and a decimal value of 126. The computer-program product, wherein said base value is a decimal value of 158. The computer-program product, wherein said plurality of random numbers is determined from a random number generator. The computer-program product, wherein said base representation is an octal representation. The computer-program product, wherein said octal representation for each of said text character by an offset of an octal value so that a resulting translated character is printable.

Another advantage of the presently preferred embodiment is to provide a data processing system having at least a processor and accessible memory to implement a method for text-based encryption, comprising means for accessing a text file with a plurality of lines of text characters; means for re-sequencing each of said text characters; means for translating a base representation for each of said text character by an offset of a base value so that a resulting translated character is printable; means for inserting a plurality of characters between each of said translated text characters on each of said line to form a random character string; means for inserting a plurality of random numbers of random characters before and after said random character string to output to a resultant file; and means for including a translated seed with said resultant file.

And another advantage of the presently preferred embodiment is to provide a method for text-based encryption, comprising accessing a text file with a plurality of lines of text characters; re-sequencing each of said text characters; translating a decimal representation for each of said text character by an offset of a decimal value of 158 so that a resulting translated character is printable; creating a seed for a random number calculation, that is determined from a clock; generating a random number according to the following random number calculation $RN_t=|(c1*RN_{t-1}+c2)MOD\ c3|$, for t= $\{1,\ldots,n\}$ where, RN=random number, and c1, c2, and c3 are coefficients that produce random numbers with sufficient fluctuation; inserting a plurality of characters between each of said translated text characters on each of said line to form a random character string; inserting said random number of random characters before and after said random character string to output to a resultant file; and including said seed with said resultant file.

And yet another advantage of the presently preferred embodiment is to provide a method for text-based encryption, comprising accessing a text file with a plurality of lines of text characters; re-sequencing each of said text characters; translating a decimal representation for each of said text character by an offset of a decimal value of 158 so that a resulting translated character is printable; creating a seed for a random number calculation, that is determined from a clock; generating a random number according to the following random number calculation: $RN_t=|(c1*RN_{t-1}+c2)MOD\ c3|$, for t= $\{1,\ldots,n\}$ where, RN=random number, and c1, c2, and c3 are coefficients that produce random numbers with sufficient fluctuation; inserting a plurality of characters between each of said translated text characters on each of said line to form a random character string; inserting said random number of random characters before and after said random character string to output to a resultant file; and including said seed with said resultant file.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 2:
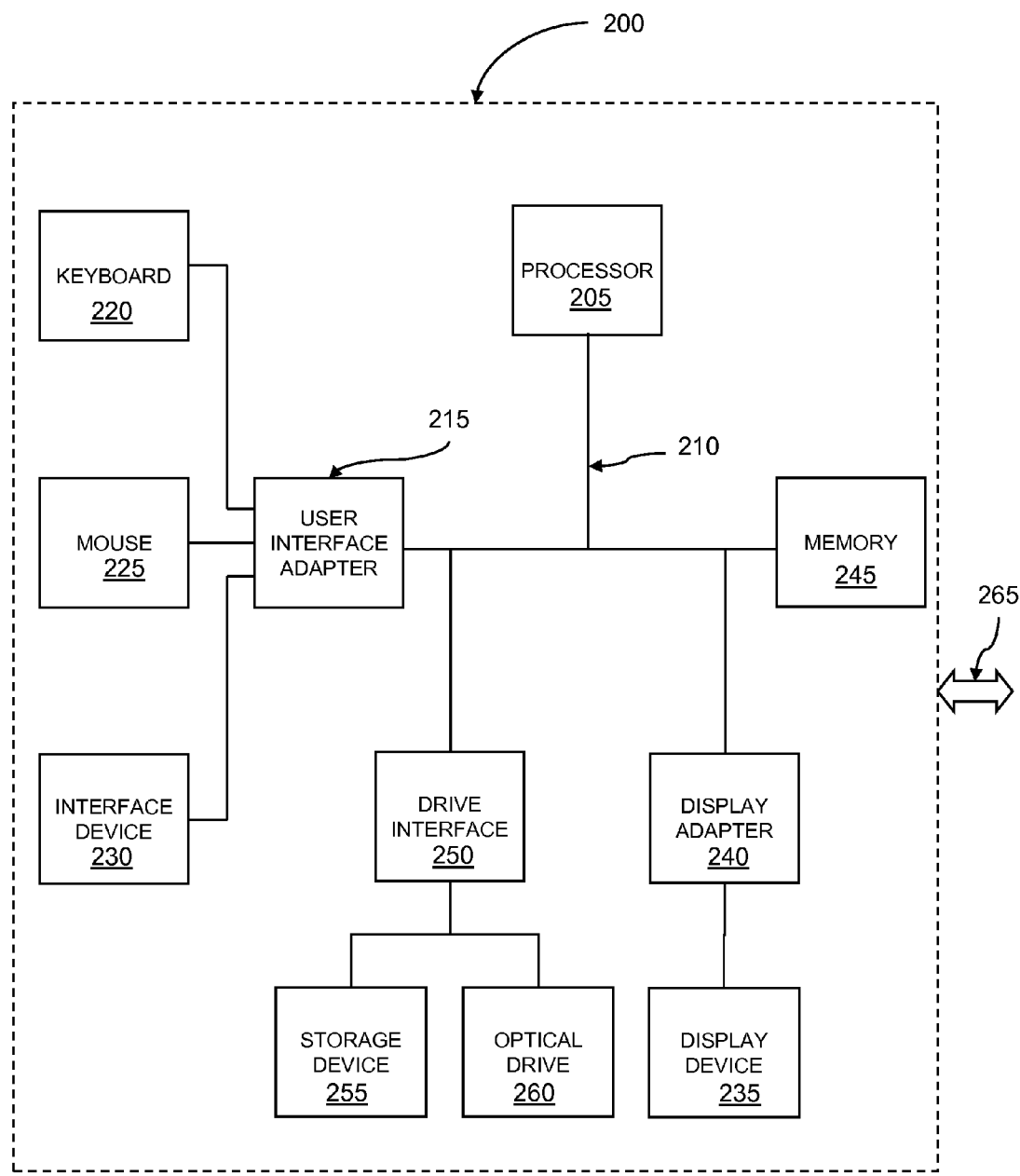
FIG. 2 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for text-based encryption using a random number generator and character offsets that is platform independent. Now therefore, in accordance with the presently preferred embodiment, an operating system executes on a computer, such as a general-purpose personal computer. FIG. 2 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 2, an exemplary system for implementing the presently preferred embodiment includes a general-purpose computing device in the form of a computer 200, such as a desktop or laptop computer, including a plurality of related peripheral devices (not depicted). The computer 200 includes a microprocessor 205 and a bus 210 employed to connect and enable communication between the microprocessor 205 and a plurality of components of the computer 200 in accordance with known techniques. The bus 210 may be any of several types of bus structures including a memory bus or memory controller, a peripheral bus, and a local bus using any of a variety of bus architectures. The computer 200 typically includes a user interface adapter 215, which connects the microprocessor 205 via the bus 210 to one or more interface devices, such as a keyboard 220, mouse 225, and/or other interface devices 230, which can be any user interface device, such as a touch sensitive screen, digitized pen entry pad, etc. The bus 210 also connects a display device 235, such as an LCD screen or monitor, to the microprocessor 205 via a display adapter 240. The bus 210 also connects the microprocessor 205 to a memory 245, which can include ROM, RAM, etc.

The computer 200 further includes a drive interface 250 that couples at least one storage device 255 and/or at least one optical drive 260 to the bus. The storage device 255 can include a hard disk drive, not shown, for reading and writing to a disk, a magnetic disk drive, not shown, for reading from or writing to a removable magnetic disk drive. Likewise the optical drive 260 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 200.

The computer 200 can communicate via a communications channel 265 with other computers or networks of computers. The computer 200 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 245 of the computer 200. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
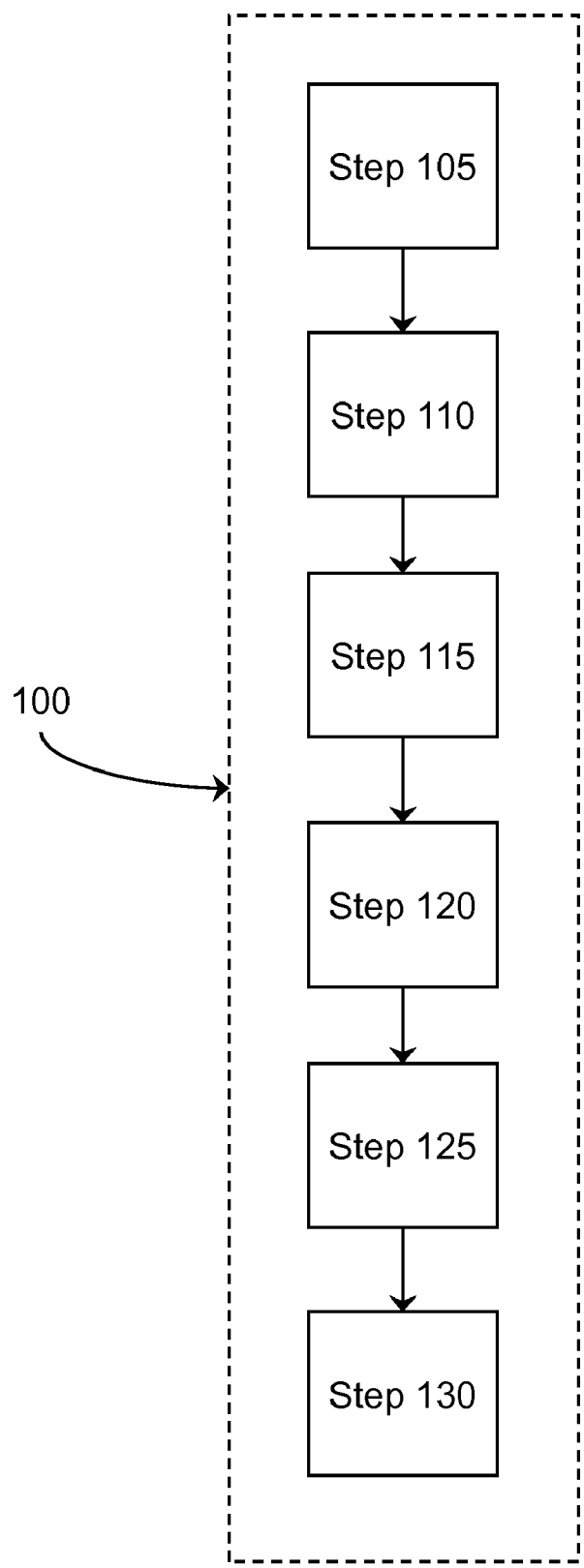
FIG. 1 is a logic flow diagram of the method employed by the presently preferred embodiment.

FIG. 1 is a logic flow diagram of the method employed by the presently preferred embodiment. Referring to FIG. 1, the presently preferred embodiment discloses a method for text-based encryption 100 by beginning with accessing a text file with a plurality of lines of code (Step 105—Access text file). Next, re-sequence each of the text characters (Step 110—Re-sequence text characters). Translate the base representation for each of the text characters by an ASCII offset of a ASCII value so that the resulting translated character is printable (Step 115—Translate base representation). Insert a random number of random characters between each of the translated text characters to form a random character string (Step 120—Insert random number between translated text characters). Next, insert a random number of random characters before and after the random character string for output to a resultant file (Step 125—Insert random number before and after random character string). Lastly, include a translated seed with the resultant file (Step 130—Seed with resultant file).

Text-Based Encryption

The computer implemented methods for text-based encryption using a random number generator and character offsets that is platform independent in accordance with the presently preferred embodiment are set forth in more detail in the steps below.

Step 1

A text file titled sample.tcl contains a single line command, "puts HelloWorld" (without quotes). This single line command will print HelloWorld to the display when executed by the interpreter of Tcl scripting language. The user desires to encrypt sample.tcl so that an unintended viewer (or person) does not ascertain the contents of the text file with the help of any common text editor or other method to obtain information from a text file. To begin the encryption process described in the presently preferred embodiment, the single line command is re-sequenced to look like, "dlroWolleH stup" (without the quotes).

Step 2

Next, each character of the re-sequenced line is converted to its base representation of an ASCII decimal (or octal) equivalent and offset by subtracting it from the decimal 158 (or octal 236). It is understood that any base number system can be used, such as binary. For example, in dlroWolleH, d is decimal 100, which is subtracted from decimal 158 to result in decimal 58 that is the colon character, ":". When considering the example command line, the resulting decimal equivalent is: 100 108 114 111 87 111 108 108 101 72 115 116 117 112, which is then offset to decimal 58 50 44 47 71 47 50 50 57 86 43 42 41 46. The ASCII equivalent of this offset decimal string, without the quotes, creates a translated string as ":2,/G/229V+*)." in this example.

Step 3

A pseudo random number generator is used to determine a random number of characters, described in more detail below, according to the following formula:

$$RN_t = |(c1*RN_{(t-1)} + c2) \bmod c3|$$

where $t = \{1, 2, \ldots, n\}$, c1, c2, and c3 are integer coefficients to produce random numbers with sufficient randomness. Through experimentation, any set of coefficients can be employed; provided a sufficient fluctuation can be produced. For example, preferably 3, 11, and 17, can be used in place of c1, c2, and c3, respectively. $RN_0$, a seed number, is determined by a clock click number fetched from the system clock, at the time of encryption. The clock click number can vary in precision from seconds to nanoseconds. For example, utilizing NT Time Epoch, the time-date of Dec. 8, 2004 at 21:56:03.9843750 GMT will produce 127470165639843750, which is then used to calculate $RN_0$. Utilizing Eq. 1:

$$RN_0 = |127470165639843750 \bmod 17|$$
$$= 11$$

$$RN_1 = |(3*RN_0 + 11) \bmod 17|$$
$$= |(3*127470165639843750 + 11) \bmod 17$$
$$= |382{,}410{,}496{,}919{,}531{,}261 \bmod 17|$$

$$RN_1 = 10$$

The ASCII decimal code for a random character is determined by adding decimal value to the random number generated by the formula above. Any number greater than 126 will be decremented by 126 and a number less than 32 will be incremented by 32; then it is translated into an ASCII character. Each digit of the seed $RN_0$, a printable numeral of the ASCII character set, is offset by subtracting its ASCII code from the decimal 158 then converted to an equivalent ASCII character, e.g., $RN_0$=>mm. A fixed number of random characters (also generated with the pseudo random number generator and the above mentioned rule) are then padded before and after the translated seed number (key). This is to further disguise the key. The string containing the encrypted seed number is then outputted to the beginning of a resultant file that will contain the encrypted text, for example, titled sample_tcl.txt.

Step 4

Having created the seed, $RN_0$, a random number of random characters are inserted after each character in the translated string, ":2,/G/229V+*).", from above. For example, knowing that RN 1 is 10, 10 random characters are inserted, where ^ is used in place of a random character in this example for simplicity, to produce:

:^^^^^^^^^^2,/G/229V+*).

The pseudo-random number generator is run again for $RN_2$ with Eq. 1, where $RN_2 = |(3*RN_1+11) \bmod 17| = |(3*10+11) \bmod 17| = |41 \bmod 17| = 7$. Now 7 random characters are inserted after the next character in the translated string to produce:

:^^^^^^^^^^2^^^^^^^,/G/229V+*).

The process of inserting random characters is iterative to form a new line. A random number of random characters calculated in the same manner discussed is then padded to the start and the end of the new line and is then outputted to the resultant file.

Step 5

The resultant file is now encrypted with the embedded seed and is viewable by use of any method to view a text file, however the details are not discernable without knowledge of the seed, which is in this case also referred to as the key. At runtime, the application will search for the sample_tcl.txt file to decrypt utilizing the seed to produce the original line of "puts HelloWorld" to display "HelloWorld" in the application.

CONCLUSION

From Step 1 through Step 5, the presently preferred embodiment has disclosed complete solution for text-based encryption using a random number generator and character offsets that is platform independent.

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment, such as the use of other character encoding methodologies or the use other random number generators, including pseudo-random number generators, computed or not. Therefore, other implementations are within the scope of the following claims.

What is claimed is:

1. A method for text-based encryption, comprising:
accessing, by a computing device, a text file including a plurality of lines of text characters;
re-sequencing the text characters in each of the plurality of lines;
translating a base representation for each of the text characters in each of the plurality of lines by an offset of a decimal value so that resulting translated characters are printable, wherein the decimal value is 158;
inserting a plurality of characters between each of the translated text characters in each of the plurality of lines to form a random character string;
inserting a plurality of random numbers of random characters before and after the random character string to output to a resultant file; and
including a translated seed number with the resultant file.

2. The method of claim 1, wherein the resultant file contains the translated seed number at a known location.

3. The method of claim 1, wherein the translated seed number is calculated from a system clock.

4. The method of 1, wherein the text file contains a plurality of commands that are readable by a scripted language.

5. The method of claim 1, wherein the resulting translated characters are within a set of printable ASCII codes.

6. The method of claim 5, wherein the set of printable of ASCII codes is between a decimal value of 32 and a decimal value of 126.

7. The method of claim 1, wherein the plurality of random numbers is determined from a random number generator.

8. The method of claim 1, wherein the base representation is an octal representation.

9. The method of claim 8, wherein the octal representation for each of the text characters in each of the plurality of lines is offset by an offset of an octal value corresponding to the decimal value so that a resulting translated character is printable.

10. A computer-program product stored on a non-transitory machine readable medium to perform a method for text-based encryption, comprising instructions operable to cause a computer to:
access a text file including a plurality of lines of text characters;
re-sequence the text characters in each of the plurality of lines;
translate a base representation for each of the text characters in each of the plurality of lines by an offset of a decimal value so that resulting translated characters are printable, wherein the decimal value is 158;
insert a plurality of characters between each of the translated text characters in each of the plurality of lines to form a random character string;
insert a plurality of random numbers of random characters before and after the random character string to output to a resultant file; and
include a translated seed number with the resultant file.

11. The computer-program product of claim 10, wherein the resultant file contains the translated seed number at a known location.

12. The computer-program product of claim 10, wherein the translated seed number is calculated from a system clock.

13. The computer-program product of claim 10, wherein the text file contains a plurality of commands that are readable by a scripted language.

14. The computer-program product of claim 10, wherein the resulting translated characters are within a set of printable ASCII codes.

15. The computer-program product of claim 14, wherein the set of printable of ASCII codes is between a decimal value of 32 and a decimal value of 126.

16. The computer-program product of claim 10, wherein the plurality of random numbers is determined from a random number generator.

17. The computer-program product of claim 10, wherein the base representation is an octal representation.

18. The computer-program product of claim 17, wherein the octal representation for each of the text characters in each of the plurality of lines is offset by an offset of an octal value corresponding to the decimal value so that a resulting translated character is printable.

19. A data processing system comprising:
a processor; and
an accessible memory storing computer executable instructions that, when executed by the processor, cause the processor to perform the steps of:
accessing a text file including a plurality of lines of text characters;
re-sequencing each of the text characters in each of the plurality of lines;

translating a base representation for each of the text characters in each of the plurality of lines by an offset of a decimal value so that resulting translated characters are printable, wherein the decimal value is 158;

inserting a plurality of characters between each of the translated text characters in each of the plurality of lines to form a random character string;

inserting a plurality of random numbers of random characters before and after the random character string to output to a resultant file; and including a translated seed number with the resultant file.

20. A method for text-based encryption, comprising:

accessing, by a computing device, a text file including a plurality of lines of text characters;

re-sequencing each of the text characters in each of the plurality of lines;

translating a decimal representation for each of the text characters by an offset of a decimal value of 158 so that a resulting translated character is printable;

creating a seed for a random number calculation, the seed determined based on a system clock;

generating a random number according to the following random number calculation:

$$RN_t = |(c1 * RN_{t-1} + c2) \text{MOD } c3|, \text{ for } t = \{1, \ldots, n\}$$

where, RN=random number, and c1, c2, and c3 are coefficients that produce random numbers with sufficient fluctuation;

inserting a plurality of characters between each of the translated text characters in each of the plurality of lines to form a random character string;

inserting the random number of random characters before and after the random character string to output to a resultant file; and including the seed with the resultant file.

* * * * *